United States Patent [19]
Finley

[11] Patent Number: 5,742,686
[45] Date of Patent: Apr. 21, 1998

[54] DEVICE AND METHOD FOR DYNAMIC ENCRYPTION

[76] Inventor: Phillip Scott Finley, P.O. Box 40293, Eugene, Oreg. 97404

[21] Appl. No.: 662,241
[22] Filed: Jun. 14, 1996
[51] Int. Cl.⁶ .................. H04L 9/28; H04L 9/00
[52] U.S. Cl. .................. 380/28; 380/49
[58] Field of Search .................. 380/49, 28

[56] References Cited

U.S. PATENT DOCUMENTS

| Re. 35,403 | 12/1996 | Dyke | 380/49 |
|---|---|---|---|
| 4,225,935 | 9/1980 | Zscheile, Jr. et al. | 364/717 |
| 4,819,267 | 4/1989 | Cargile et al. | 380/23 |
| 4,914,697 | 4/1990 | Dabbish et al. | 380/28 |
| 5,091,938 | 2/1992 | Thompson et al. | 380/21 |
| 5,199,069 | 3/1993 | Barrett et al. | 380/28 |
| 5,222,139 | 6/1993 | Takaragi et al. | 380/28 |
| 5,249,227 | 9/1993 | Bergum | 380/4 |
| 5,341,426 | 8/1994 | Barney et al. | 380/21 |
| 5,365,589 | 11/1994 | Gutowitz | 380/43 |
| 5,412,730 | 5/1995 | Jones | 380/46 |
| 5,488,661 | 1/1996 | Matsui | 380/29 |
| 5,533,127 | 7/1996 | Luther | 380/28 |
| 5,541,996 | 7/1996 | Ridenour | 380/46 |

Primary Examiner—Thomas H. Tarcza
Assistant Examiner—Carmen D. White
Attorney, Agent, or Firm—Palmatier, Sjoquist, Helget & Voigt, P.A.; Douglas J. Christensen, Esq.; Nelson R. Capes, Esq.

[57] ABSTRACT

An apparatus and method for dynamic encryption of information including data, voice, and graphics, consisting of a random access memory containing encryption and decryption programs and the information to be encrypted and decrypted, an encryption processor executing the encryption and decryption programs, the encryption and decryption programs being a code set whose members are distinct encryption/decryption codes executed serially by the encryption processor to encrypt and decrypt the information, and also being optionally repetitively executed, and a data set in the random access memory specifying the order and execution and number of repetitions of each member of the code set.

44 Claims, 8 Drawing Sheets

FIRST ENCRYPTION APPARATUS

1. INIALIZE:
Upon power-up, PROM or
EPROM firmware loads into
local RAM.

2. BROADCAST A PING:
Host sends signal out
over network line using
a common, uncoded protocol.

(A)

(B)

4. FIRST CODED PROTOCOL:
Host selects the first Protocol
encryption scheme from the
main system's code library
and identifies it to the
target.

(C)

6. VERIFY AND TEST:
If Target does not have a
common initial coded protocol,
system can be set to either -
A) Provide one (non-secure)
B) Notify 'CNE' to courrier
start-up sets. Then, return
to step #4.
If Target successfully matches
startup, then system creates a
new data set to replace the one
that the two cards just used.
It sends this data set, which
is encrypted by the present
protocol.

(D)

(E)

8. PROCEED WITH NORMAL DATA TRAFFIC
Having received confirmation, normal
data traffic resumes.

9. CHANGE TO NEW CODED PROTOCOL
Periodically, or at request of any
apparatus, system creates a new data
set, sending it to target card using
present code.

DEVICE AND METHOD FOR DYNAMIC ENCRYPTION

BACKGROUND OF THE INVENTION

Numerous techniques for limiting access to computer systems and software and for enabling secure communications of data are practiced. In multiuser systems, it is typical for each user to have an identification code and/or a password which the user must enter before gaining access to the system. Security of the system can be compromised when an authorized user reveals his or her identification code and/or password to unauthorized persons or the access code is discovered by a systematic attack such as used by hackers.

Further techniques for securing computers, software and communications include the use of seemingly random generated passwords affording the appropriate access. In some systems, these passwords are generated in response to an inquiry or stimulus from the computer, software or communications source to which access is desired. For these types of systems, there are a number of approaches used by hackers and those intent on stealing valuable information in order to break into the system.

Despite the existence of techniques for limiting access to computer systems, there has not been an inexpensive apparatus for encrypting and decrypting information flowing between personal computers (PCs) in such a way that it is impossible for the encryption scheme to be "hacked." No code is unbreakable; and given enough time, it is possible for a hacker to break into any computer system that uses a single or even a small number of encryption schemes.

There is, however, the kind of encryption scheme which is described as "fully sufficient." It generates the kind of encryption where either the message content or the hacker trying to crack it will die of old age before his computer finally is able to find the correct codes. There are a number of encryption codes available. Each code alone might not be effective enough; but in combination, they become formidable.

The problem with such an approach is the "time barrier." As a hypothetical example, if it takes five cumulative minutes for a 100 megahertz processor to encrypt (or decrypt) a particular message, it would take a very long time for a hacker to try a very large number (perhaps one billion) permutations before he has any realistic probability of getting the correct key. But the hacker might still be able to break the code. If instead, a one hour encryption process is used, the probability of a hacker breaking the code is almost nil. However, such a lengthy encryption and decryption process would put an enormous burden on the legitimate user's PC. On an older non-multitasking PC, all activity would be frozen until encryption was complete. Even on multitasking systems, it would severely drag performance and probably cause lockups.

A second problem with traditional encryption schemes is lack of true randomness. Technically speaking, computers do not generate truly "random" numbers, but instead they generate "pseudo-random" numbers. A standard program routine which generates random numbers uses a "seed." Give it the same seed, and it will generate the same output. Thus, traditional encryption schemes which depend upon computer generation of random numbers are subject to attack.

There is a need for an apparatus for dynamic encryption of information including voice, data, and graphics. Such an encrypting system must be: very simple and easy to use, even for non-computer literates; impossible to decode; have a low burden even on non-multitasking computers; have both manual and fully automatic modes; provide documentation to show the user how safe the system is; and eventually provide features for inter-processing with clipboards, word processors, modem/network software, and function as a multi-user encryption server.

SUMMARY OF THE INVENTION

An apparatus and method for dynamic encryption of information including data, voice, and graphics, consisting of a random access memory containing encryption and decryption programs and the information to be encrypted and decrypted, an encryption processor executing the encryption and decryption programs, the encryption and decryption programs being a code set whose members are distinct encryption/decryption codes executed serially by the encryption processor to encrypt and decrypt the information, and also being optionally repetitively executed, and a data set in the random access memory specifying the order and execution and number of repetitions of each member of the code set.

A principal object and advantage of the encryption apparatus is that it provides powerful parallel processing capability to offload the burden of encryption from the host or personal computer.

A second object and advantage of the encryption apparatus and method is that it allows the creation of custom encryption codes on a per user basis instead of just selecting a code from a limited number. Each copy of the software will randomize differently to produce a unique data set specifying the members, order of execution, and repetition count of a library of distinct encryption codes. There is no way of knowing in advance what such a "recipe" will be. Even if a hacker knows every encryption code and password that the user could use, the hacker has no way of knowing which encryption codes will be randomly selected or the order or repetition count in which they will be executed. Only another authorized user who has been provided with a copy of the "recipe" has this information.

Another object and advantage of the encryption apparatus and method is that it allows a given user to customize the "recipe" manually rather than letting the computer do it. Thus, the user can customize the "recipe" to obtain the extent of protection desired versus the amount of processor time needed to do the encryption. For example, if the user desired to encrypt a telephone conversation, he could not afford to have the encryption "recipe" take several minutes to encrypt each word. On the other hand, for an extremely sensitive data file, a "recipe" could be selected that would take, say, an hour to encrypt the file; and the file would be essentially impossible to break into. The programming can provide a "TEST" button which will tell the user, for example, "It will take a 100 megahertz processor 9 years, 6 months, 4 days, 2 hours, and 53 seconds of continuous processing before it will have a 3% chance of decoding this text." The Test menu can also allow the user to change default values to see, for example, how long it would take a 500 megahertz processor to have a 25% chance. The Test feature assumes that hackers will already know all encryption codes but do not know the unique "recipe".

Another object and advantage of the encryption apparatus and method is that it allows two computers to dynamically modify the "recipe" periodically without any human intervention. Thus, even if a hacker were able to obtain a copy of the recipe, a few minutes later a completely different recipe would be generated; and the hacker's knowledge would be useless. The "recipe" could change every minute. The first apparatus sends the new "recipe" to the next apparatus using the present "recipe." At the beginning of the next minute, both apparatus begin transceiving with each other using the new "recipe." The old recipes are erased after they are used. Once the transmission is initiated between the apparatus, no human being knows what "recipes" the two apparatus are currently using.

Another object and advantage of the apparatus and method is that it allows network addresses as well as data to be encrypted. On the Internet, for example, each data package has a component destination address. Hackers often try to strip this address to 'find their target.' The apparatus would function by having each node in the Internet encrypt the destination address with a code (or "recipe") which only the next server knows how to unscramble. Rather than using a system which, for example, uses a fixed Ethernet protocol, the entire framed package is encrypted into a dynamic protocol, one designed by one apparatus and agreed to by the next.

Another object and advantage of the encryption apparatus is that it provides for separate, parallel processing processors for "batch" encryption and "real-time" encryption so that both types of encryption may be simultaneously performed. Potentially, the "batch" encryption utilizes a more complicated "recipe" than the "real-time" encryption.

Another object and advantage of the encryption apparatus is that it has a communications port for voice, data, and graphics. In this day and age, there is a shortage of ports as well as expansion slots (or, more specifically, interrupts for those slots) on PCs. Office workers want to be sending a fax, talking on the phone, linking up to special modem-reached servers, and wait for phone calls on incoming lines. The encryption apparatus cannot only encrypt high level messages but it can also have the modem capability of afterwards dialing up the receiver (repeatedly if necessary), sending the encrypted message, and then letting the user know that the message made it or did not make it and why. All this could be done without bottlenecking the PC's normal modem line. For example, a national restaurant chain owner could send hundreds of faxes or downloads to franchises all across the country in two steps: encrypt the message and send to a group name. The apparatus can systematically pull each phone number or Internet number from the owner's directory and begin connecting with each one. The owner gets it started, goes home, and the apparatus will keep dialing and transmitting all through the night.

The programming can also prompt the user for what level of protection they want. For example, a stock exchange message might be out of date after one day, but a federal witness relocation file might need a century of protection.

Another object and advantage of the encryption apparatus is that it provides an interface to a local area network (LAN) such as Ethernet™ or Token Ring™. This brings the benefits of dynamic encryption described above to LANs.

Another object and advantage of the encryption apparatus is that it may provide an interface to a cellular telephone allowing voice conversations to be encrypted uniquely.

Another object and advantage of the present invention is that it may provide an interface to a car alarm system and a remote alarm transmitter allowing transmissions between the two to be encrypted uniquely.

Another object and advantage of the present invention is that it may have a relay switch, controlled by the encryption processor, for enabling and disabling the flow of information between the communications port and the host computer.

Another object and advantage of the present invention is that it may have an interface to a mass storage device, such as a reel-to-reel tape drive, for storing encrypted and unencrypted information.

Another object and advantage of the present invention is that it may reside either on a standard expansion card for a personal computer or on the personal computer's motherboard.

Another object and advantage of the present invention is that it provides a common encryption scheme for personal computers, cellular phones, car alarms, and other devices which may be controlled from a central computer and allows all such devices to be linked on a network.

BRIEF DESCRIPTION OF THE DRAWINGS

FIGS. 6A and 6B are detailed flowcharts showing the interaction between two machines of the present invention to change the encryption data set periodically.

DETAILED DESCRIPTION OF THE PREFERRED EMBODIMENTS

Figure 1:
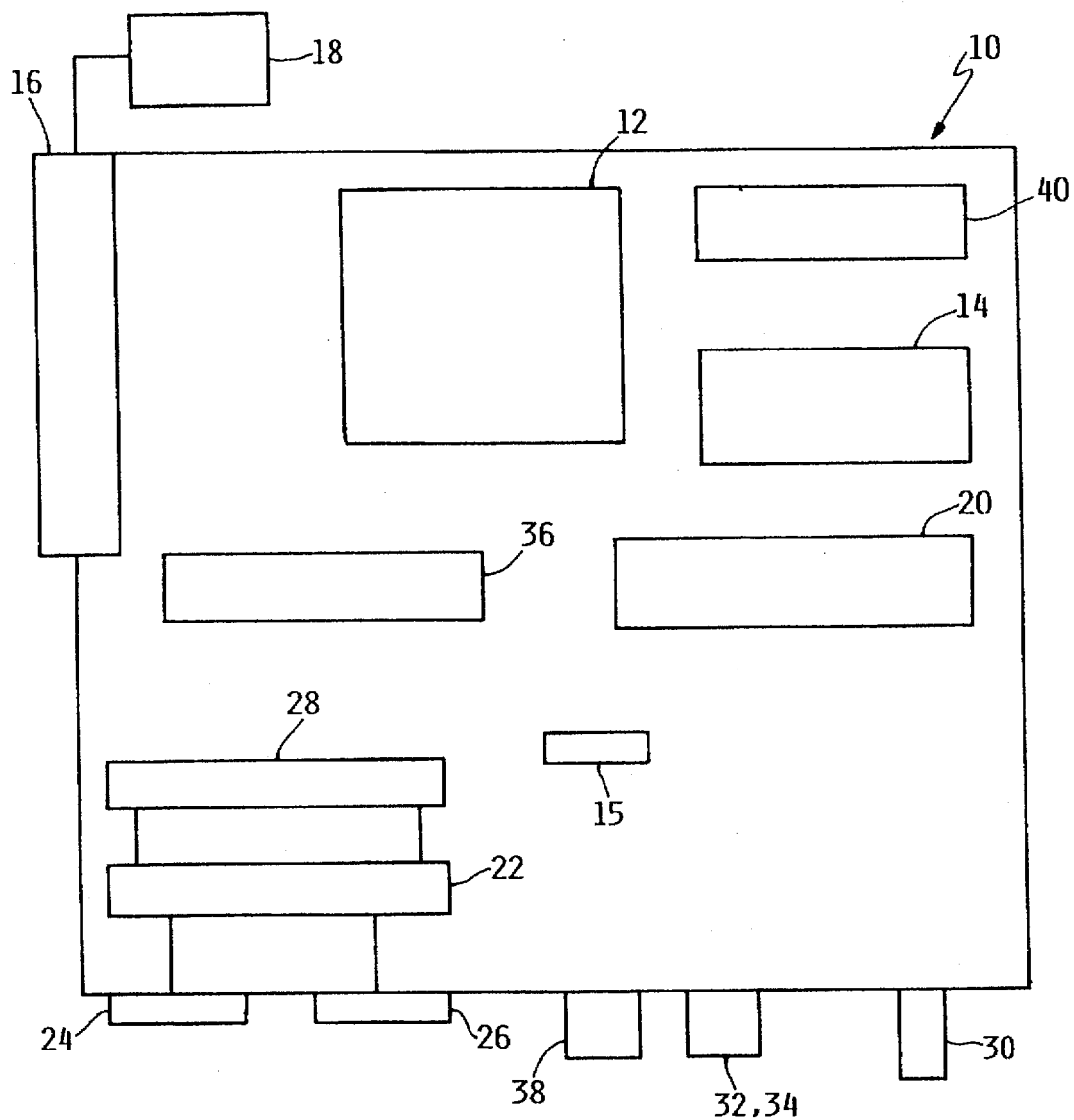
FIG. 1 is a schematic of a specific machine or apparatus embodying the present invention.

A specific machine or apparatus embodying the present invention is shown in FIG. 1 by reference numeral 10.

The apparatus 10 comprises a random-access memory (RAM) 12 containing encryption and decryption programs and the information to be encrypted and decrypted. The apparatus 10 also comprises a first encryption processor 14 executing the encryption and decryption programs contained in the RAM 12.

The apparatus 10 may have a counter 15 for counting the number of complete encryptions as will be more completely discussed below.

The apparatus 10 preferably has an interface 16 to a host computer 18 as will be more completely discussed below.

The apparatus 10 may have a second encryption processor 20 executing in parallel with the first encryption processor 14 and controlling the first encryption processor 14.

The apparatus 10 preferably has a communications port 22 for voice and/or data. The communications port 22 further comprises a telephone line interface 24 and a handset interface 26. Attached to the communications port 22 may preferably be an analog/digital converter 28.

The apparatus 10 may also include an interface 30 to a local area network.

The apparatus 10 may also include an interface 32 to a cellular telephone and an interface 34 to a car alarm system and a remote car alarm transmitter.

The apparatus 10 may also include a relay switch 36 for enabling and disabling the flow of information between the communications port 22 and the host computer interface 16. The first encryption processor 14 preferably controls the relay switch 36.

The apparatus 10 may also include an interface 38 to a mass storage device for transferring information between the apparatus 10 and a mass storage device.

The apparatus 10 may also include a non-volatile memory 40 containing start-up programs.

Figure 2:
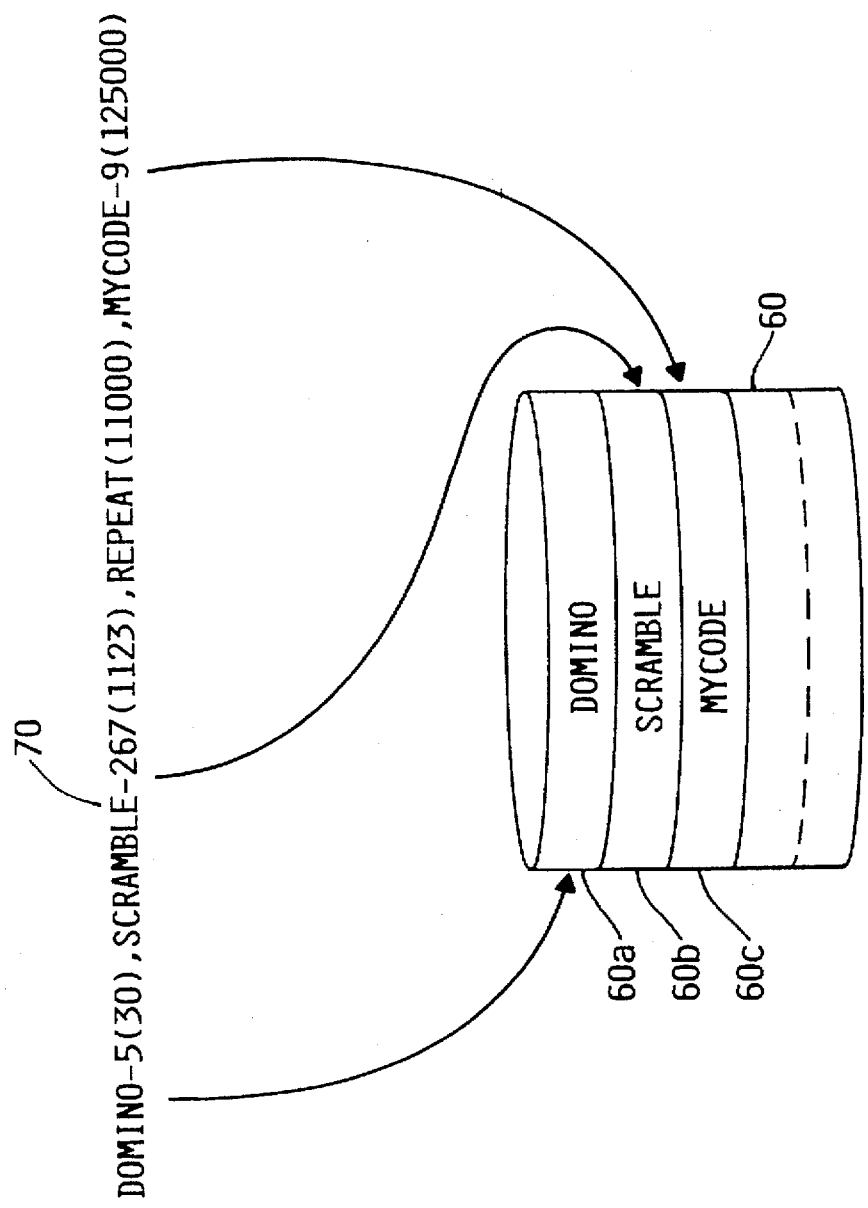
FIG. 2 is a schematic showing one embodiment of the data set and code set of the present invention.

The encryption and decryption programs executing in the apparatus 10 are shown in FIGS. 2–5. As shown in FIG. 2, the encryption and decryption programs further comprise a code set 60 whose members 60a, 60b, 60c, etc. are distinct encryption/decryption codes which are executed serially by the first encryption processor 14 to encrypt and decrypt the information. Each member 60a, 60b, 60c, etc. may optionally be repetitively executed.

The order of execution and number of times each member 60a, 60b, 60c is executed is specified in a data set 70 in the RAM 12.

The data set 70 may preferably be randomly generated. In this way, there is no way for an unauthorized user to determine the encryption "recipe" (i.e., the contents of data set 70). One way to do this, as is known in the art, is to start with a seed such as a random number. Alternatively, the seed may be an identification signature which is unique to each medium containing the encryption and decryption programs. For example, a diskette ID may serve the dual purpose of identifying the medium and providing the seed. The seed may in addition contain the date and time of day at which encryption begins. Alternatively, or in addition, the seed may be based on the counter 15 and include the count of the number of completed encryptions. Alternatively, the seed may comprise the length of the last portion of information, such as a word, that was encrypted.

Instead of the data set 70 being randomly generated, it may be created by the user of the apparatus 10. In such a case, the apparatus 10 further preferably comprises a host computer 18 and host computer interface 16 and software executing on the host computer 18 to create the data set 70. Preferably, the apparatus 10 will also include user interface software adapted to allow the user to specify the contents of the data set 70 to the software which creates the data set 70. For example, the Microsoft Windows™ operating system may be used as the user interface software.

The software and user interface software may include a "TEST" function that statistically determines the probability of deciphering the "recipe" after a certain period.

FIG. 2 shows one example of the data set 70. Here the data set 70 contains a series of terms separated by commas, but any separation character may be used. Each term specifies one member of the code set 60. As shown in the Figure, the data set 70 also has an optional execution count in parentheses after each of the terms.

The data set 70 shown in FIG. 2 specifies that the information to be encrypted is first run through an encrypting code called DOMINO-5 30 times in succession. A domino code is dynamic. Every character has a value. The algorithm takes each character to be encoded and shifts the value according to the value of the letter(s) that came before it. Previous word size can also influence the offset. Thus, the first "e" in the same message might be encoded as an upper-case "A." The next "e" in the same message might be encoded as the number "1."

The data set 70 next specifies that the information to be encrypted is next run through an encrypting code called SCRAMBLE-267 1,123 times in succession. SCRAMBLE-267 could, for example, take characters 1 through 10, reverse their order, and then swap them for characters 41 through 50.

The data set 70 next specifies that everything done since the beginning of encryption be REPEATed 11,000 times.

Finally, a user-created encrypting code called MYCODE-9 is executed 125,000 times.

Figure 3:
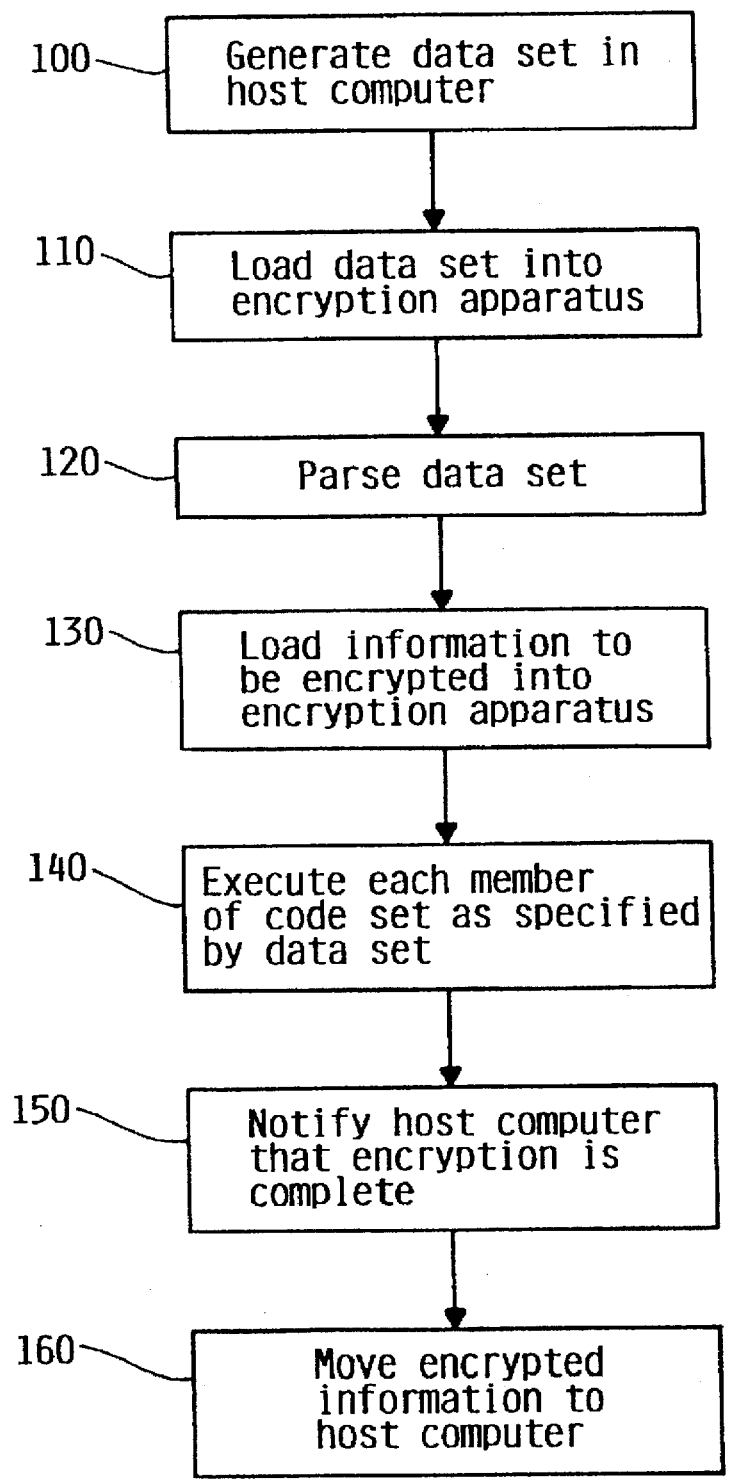
FIG. 3 is a flowchart for a computer program executing in the apparatus of FIG. 1 in "batch" mode.

FIG. 3 is a flowchart of one of the encryption and decryption programs executing in the first encryption processor 14. In this embodiment, the apparatus 10 is being used in "batch" mode to encrypt some information residing on the host computer 18.

At step 100, the host computer or first location generates the data set 70, either randomly or under user control as discussed above. At step 110, the host computer 18 loads the data set 70 into the encryption apparatus 10 by means of the host computer interface 16. At step 120, the encryption apparatus 10 parses the data set 70. For example, in the example shown in FIG. 2 such parsing would consist of looking for the next successive comma in the data set 70. However, the exact rules for parsing the data set 70 will depend on the character which is used in separating the terms within the data set as is well-known in the art.

At step 130, the host computer 18 loads the information to be encrypted into the encryption apparatus 10. At step 140, the encryption apparatus 10 executes, as by the first encryption processor 14, each of the members 60a, 60b, 60c, etc. of the code set 60 in the order and number of repetitions specified in the data set 70. This results in the information becoming encrypted.

At step 150, the encryption apparatus 10 notifies the host computer 18, for example by an interrupt, that encryption is complete. At step 160, the encrypted information is moved to the host computer 18.

Figure 4:
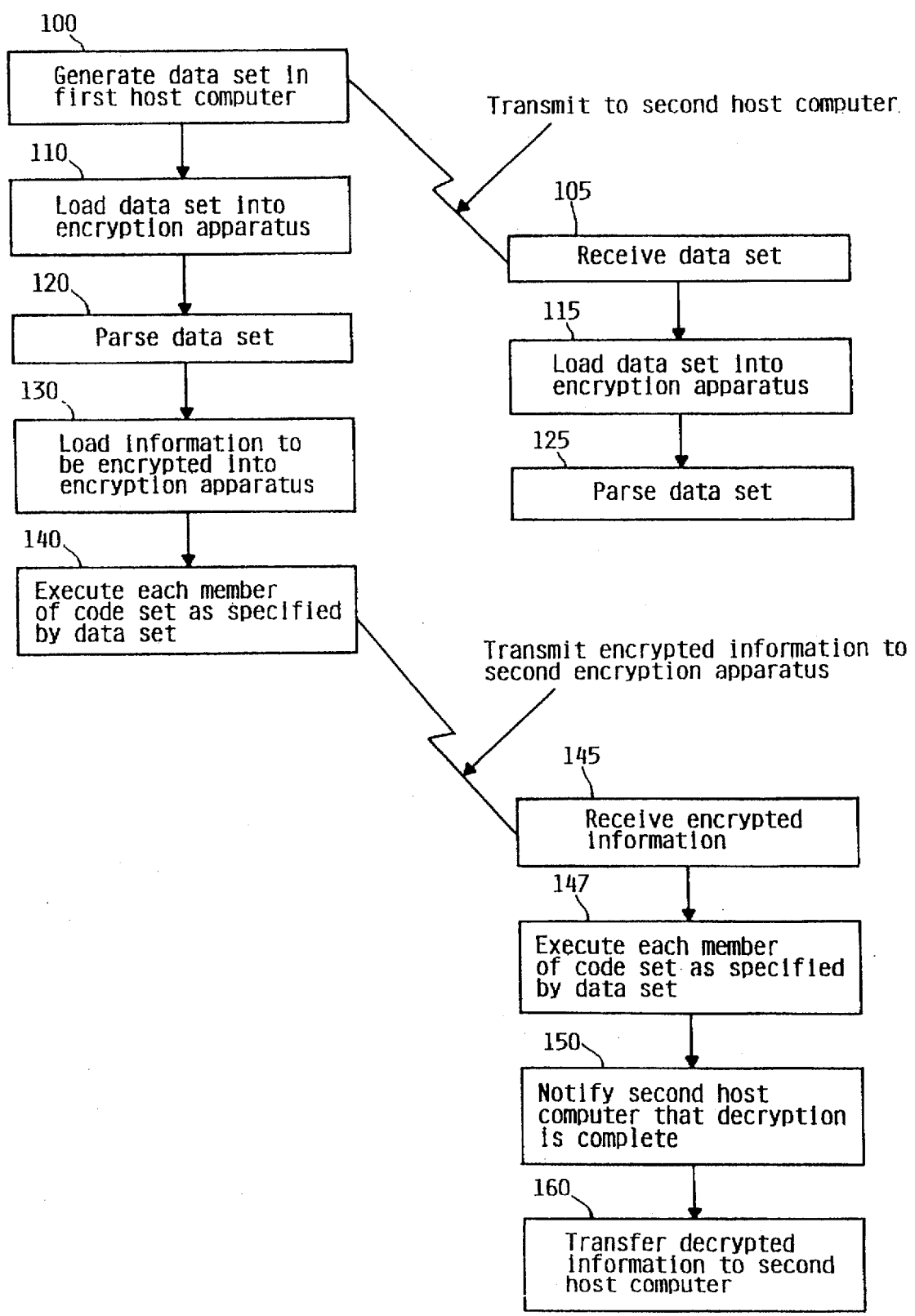
FIG. 4 is a flowchart for a computer program executing in the apparatus of FIG. 1 in "real-time" mode.

FIG. 4 is a flow chart for another set of encryption and decryption programs. In the Figure, two of the apparatus 10 are connected together over a network. Here, "network" refers to any method of connecting two or more of the apparatus 10 together. Examples would be a local area network such as Ethernet™ or Token Ring™ or a wide-area network such as the Internet. FIG. 4 shows encryption and decryption in "real-time" mode, i.e., as the two apparatus 10 "talk" to each other.

Steps 100–140 are the same as described above.

At step 105, the first host computer or first location transmits the data set 70 and perhaps also the code set 60 to the second host computer or second location. "Transmit" means any method of delivering the data set 70 and perhaps the code set 60, for example, by mail or by transmission over a local area network or a wide-area network. For example, the data set 70 and perhaps the code set 60 could be transmitted over the communications port 22 or over the network interface 30. At step 115, the second host computer loads the data set 70 into the second encryption apparatus. At step 125, the second encryption apparatus parses the data set 70 as described above.

Following step 140, the first encryption apparatus transmits the encrypted information to the second encryption apparatus at step 145, and the second encryption apparatus receives the transmitted encrypted information.

Step 147 is the same as step 140, except that it is executed in the second encryption apparatus to decrypt the transmitted information. That is, the data set 70 is traversed in reverse order.

Steps 150 and 160 are the same as described above, except that they are executed in the second apparatus and second host computer.

The "real-time" programs of FIG. 4 may be executed in the second encryption processor while the "batch" programs of FIG. 3 are executed in the first encryption processor. This provides for the ability to do "batch" encryption and "real-time" encryption simultaneously.

Figure 5:
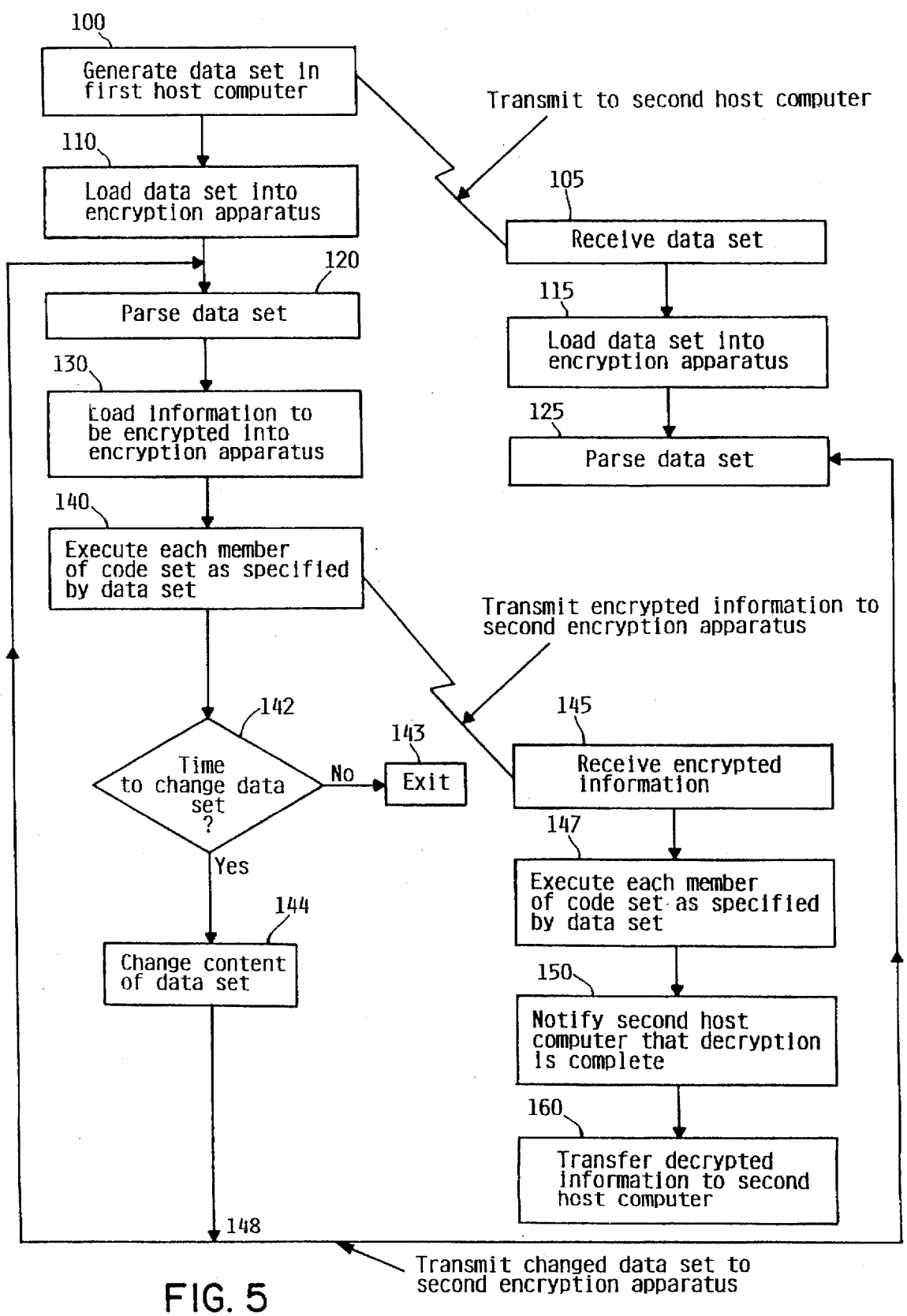
FIG. 5 is a flowchart for a computer program executing in the apparatus of FIG. 1 in "real-time" mode and including the ability to dynamically change the encryption data set periodically.

FIG. 5 is a flowchart of the encryption and decryption programs executing in the apparatus 10 and including the further ability for the apparatus 10 to dynamically change the data set 70 periodically and to communicate this change to other of the apparatus 10.

Steps 100–140, 105–125, and 145–160 are the same as discussed above.

At step 142, the apparatus 10 makes a decision on whether it is time to change the data set 70. This could be done, for example, by comparing a real-time clock to a predetermined date and time. If it is not time to change the data set 70, the apparatus 10 exits or "goes to sleep." If it is time to change the data set 70, the apparatus 10 changes the content of the data set 70 at step 144. This might consist, for example, of replacing the term MYCODE-9 with a term MYCODE-10, which specifies a different user-created code. At step 148, the changed data set 70 is transmitted to the second encryption apparatus as was described above at step 105. The second encryption apparatus then parses the changed data set 70 at step 125 and prepares to receive the next set of encrypted information which will be encrypted according to the changed data set 70. Also at step 148, the first apparatus returns to step 120 to parse the changed data set 70.

Figure 6B:
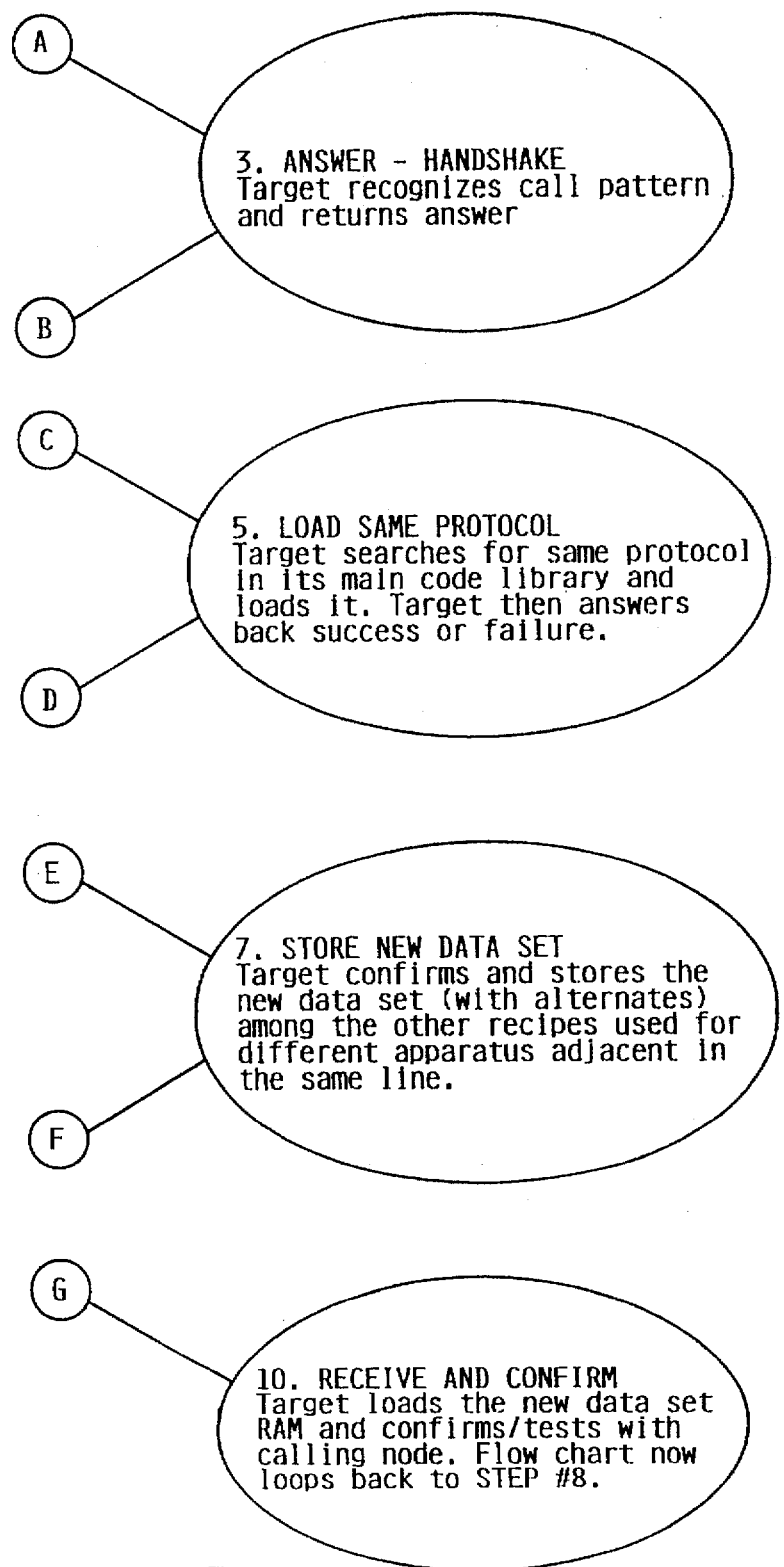

FIG. 6 specifies in more detail how the two apparatus 10 exchange the changed data set 70. At step 2, the first apparatus (the "host") broadcasts a "ping" signal over the network to the target apparatus using a common, uncoded protocol. At step 3, the target apparatus recognizes the call pattern and returns an answer. At step 4, the "host" selects the first encryption scheme (i.e., data set 70 and code set 60) and identifies it to the target. At step 5, the target searches its libraries for the same encryption scheme and loads it. The target then answers back success or failure. At step 6, the "host" receives the target's answer. If the target does not have a common encryption scheme, the "host" can either transmit the encryption scheme to the target or notify a communications network engineer (CNE) to courier a copy of the encryption scheme to the target. If the target successfully matches the encryption scheme, the "host" creates a new data set 70 and transmits the new data set 70 to the target encrypted under the present data set. At step 7, the target stores the new data set 70, confirms receipt to the host, parses the data set 70, and resumes communication with the host under the new data set 70 rules (step 8). At step 9, the host may change the data set 70 and send it to the target using the present data set 70, and at step 10 the target receives the new data set 70, confirms receipt to the host, and returns to step 8.

Figure 7:
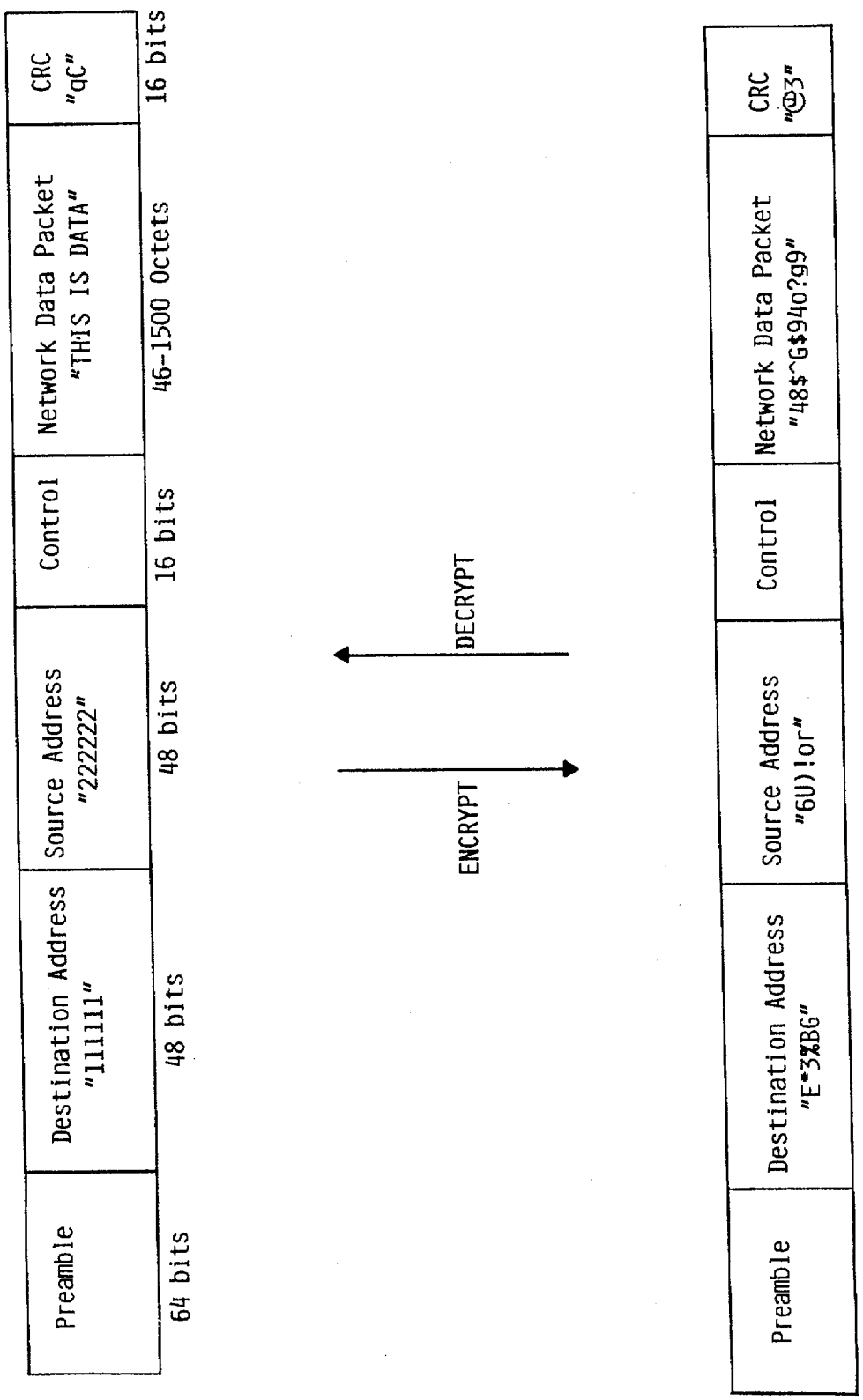
FIG. 7 is a schematic of the CSMA/CD protocol frames exchanged between two machines where the network addresses are encrypted.

FIG. 7 shows that not only end-user data but the network addresses of each of the apparatus 10 connected in a network may be encrypted and decrypted under any of the programming discussed above. In this way, it is impossible for a hacker to "strip off" the network addresses as a first step in breaking into one of the host computers, because the encryption of the network addresses is constantly changing.

The communications port 22 may be used for transmitting voice, data, or graphics, and the information transmitted may be unencrypted or encrypted. For the transmission of information, the telephone line interface 24 may be analog (e.g., a modem) or digital (e.g., Integrated Services Digital Network, ISDN). In the case of an analog interface, the analog/digital converter 28 may be used to convert an analog signal from the telephone line interface to digital information. Voice "real-time" encryption may be performed by taking an analog signal from the telephone handset interface 26, digitizing it by the analog/digital converter 28, encrypting it, and sending it out over the telephone line interface 24. The communications port 22 may also have the ability to send and receive facsimile (fax) messages.

The apparatus 10 may optionally include a relay switch 36 for enabling and disabling the flow of information between the communications port 22 and the host computer interface 16. The first encryption processor 14 preferably controls the relay switch 36. The relay switch 36 may be used to isolate or "wall up" the host computer after an extremely-sensitive file has been sent to the apparatus 10, decrypted, and transferred to the host computer 18. The relay switch 36 then disconnects the communications port. It would then be impossible for a hacker to enter the apparatus 10 or host computer 18 until the relay switch 36 is reset. In another application, a network server could quickly wall up all the computers on the network if a security program detected intruding activity across a telephone line.

The apparatus 10 may also include an interface 38 to a mass storage device for transferring information between the apparatus 10 and the mass storage device. The mass storage device may be used to keep a permanent record of information flowing through the apparatus 10, in either encrypted or unencrypted form. An example of such a mass storage device would be a reel-to-reel tape drive.

The apparatus 10 may preferably include a non-volatile memory 40 containing start-up programs that execute when the apparatus 10 is powered on.

The apparatus 10 may preferably reside on a standard expansion card for a personal computer. As discussed earlier, higher levels of encryption will bog down or lock up most PCs. By passing the information to be encrypted to the card along with the encryption codes and passwords, the card will then perform CPU-breaking tasks while the user's PC goes on supporting spreadsheets, word processors, etc. Having the apparatus 10 on an expansion card would keep the initial cost of implementation down. Alternatively, the apparatus 10 could be built into the motherboard of a personal computer to provide greater throughput.

If sufficient miniaturization can be done, the apparatus 10 may be built into other devices that would benefit from dynamic encryption. For example, the apparatus 10 could be built into a cellular telephone via interface 32 to allow dynamic encryption of voice. As another example, the apparatus 10 could be built into both a car alarm and the remote alarm transmitter via interface 34, so that the arming and disarming codes would be dynamically encrypted.

Finally, the encryption and decryption programs may be centrally maintained on a host computer 18 and distributed to all of the above devices so that PCs, cell phones, car alarms, and other devices may all be encrypted by a common scheme and linked over a network.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. An apparatus for dynamic encryption of information including data, voice, and graphics, comprising:
   a random-access memory containing more than one distinct encryption and decryption programs and the information to be encrypted and decrypted,
   a first encryption processor executing said encryption and decryption programs,
   wherein said encryption and decryption programs further comprise a code set, the members of said code set being executed serially by said first encryption processor, each member partially encrypting the information, each member of said code set being optionally repetitively executed, and
   a data set in said random access memory specifying the order of execution of said members of said code set and the number of times each such member is executed, the contents of said data set changing automatically on a periodic basis.

2. The apparatus of claim 1, wherein said data set is randomly generated based on a seed.

3. The apparatus of claim 2, wherein said seed is an identification signature unique to each medium containing said encryption and decryption programs.

4. The apparatus of claim 3, wherein said seed further comprises the date and time of day at which encryption begins.

5. The apparatus of claim 3, wherein said apparatus further comprises a counter which counts the number of complete encryptions and said seed further comprises said count of complete encryptions.

6. The apparatus of claim 3, wherein said seed further comprises the length of the last portion of information encrypted.

7. The apparatus of claim 2, wherein said data set is created by the user.

8. The apparatus of claim 7, further comprising user software executing on a host computer connected to said apparatus by a host computer interface and said user software creating said data set.

9. The apparatus of claim 8, further comprising user interface software adapted to allow the user to specify the contents of said data set to said user software.

10. The apparatus of claim 9, wherein said user interface software allows the user to test the statistical probability of an unauthorized user deciphering said data set.

11. The apparatus of claim 1, further comprising a second encryption processor executing in parallel to said first encryption processor and controlling said first encryption processor.

12. The apparatus of claim 11, wherein said first encryption processor performs batch encryption/decryption and said second encryption processor performs real-time encryption/decryption.

13. The apparatus of claim 1, further comprising a communications port for voice and data.

14. The apparatus of claim 13, wherein said communications port further comprises a telephone line interface and a handset interface.

15. The apparatus of claim 14, further comprising an analog/digital converter connected to said communications port.

16. The apparatus of claim 13, further comprising a host computer interface for connecting said apparatus to a host computer containing the information to be encrypted and decrypted.

17. The apparatus of claim 1, wherein the contents of said data set changes periodically.

18. The apparatus of claim 17, wherein two of said apparatus are connected in a network and cooperate to periodically, automatically change the contents of said data set.

19. The apparatus of claim 18, further comprising a network interface to a local area network.

20. The apparatus of claim 19, wherein the network addresses of each of said apparatus are encrypted by one of said two apparatuses.

21. The apparatus of claim 1, further comprising an interface to a cellular telephone.

22. The apparatus of claim 1, further comprising an interface to a car alarm system and a remote car alarm transmitter.

23. The apparatus of claim 16, further comprising a relay switch for enabling and disabling the flow of information between said communications port and said host computer interface, said first encryption processor controlling said relay switch.

24. The apparatus of claim 1, further comprising a mass storage device interface for transferring information between said apparatus and a mass storage device.

25. The apparatus of claim 1, wherein said apparatus resides on a standard expansion card for a personal computer.

26. The apparatus of claim 1, wherein said apparatus resides on the motherboard of a personal computer.

27. The apparatus of claim 1, further comprising a non-volatile memory containing start-up programs.

28. A method for performing dynamic encryption and decryption of information including data, voice, and graphics, comprising the steps of:
   in a first host computer, generating a data set whose contents specify the order of execution and number of repetitions of each member of a code set having multiple members whose members are distinct encryption/decryption codes stored in said host computer,
   loading said data set from said first host computer into an encryption apparatus,
   parsing said data set in said encryption apparatus,
   loading each member of said code set into said encryption apparatus,
   loading the information to be encrypted into said encryption apparatus,
   executing each member of said code set in said encryption apparatus in the order of execution and number of repetitions indicated by said data set each member partially encrypting the information,
   notifying the first host computer at the completion of encryption of the information,
   moving the encrypted information from said encryption apparatus to the first host computer,
   transmitting the contents of said data set and the members of said code set to a second host computer,
   transmitting the encrypted information to a second encryption apparatus connected to said first encryption apparatus over a network, and said second encryption apparatus parsing said data set, loading the members of said code set from said second host computer, executing the members of said code set to decrypt the information, notifying said second host computer at the completion of decryption of the information, and transferring the decrypted information to said second host computer,
   changing the contents of said data set automatically and periodically at said first encryption apparatus and communicating the changed contents of said data set to said second encryption apparatus.

29. The method of claim 28, wherein said data set generation step is performed without user intervention.

30. The method of claim 28, wherein said data set generation step is controlled by the user.

31. The method of claim 28, comprising the further step of encrypting the network address of said second encryption apparatus at said first encryption apparatus, and decrypting the network address of said second encryption apparatus at said second encryption apparatus.

32. A method for performing dynamic encryption of information including data, voice, and graphics at a first location and dynamic decryption of the information at a second location, comprising the steps of:

at the first location:
generating a data set whose contents specify the order of execution and number of repetitions of each member of a code set having multiple members, said members being distinct encryption/decryption codes,
transmitting said data set and said code set to the second location,
parsing said data set,
executing each member of said code set in the order of execution and number of repetitions indicated by said data set, each member encrypting the information,
transmitting the encrypted information to the second location, and at the second location:
receiving said data set and said code set from the first location,
parsing said data set, and
executing each member of said code set in the order of execution and number of repetitions indicated by said data set to decrypt the information,
wherein the contents of said data set is automatically and periodically changed and the changed contents are transmitted from the first location to the second location.

33. The method of claim 32, wherein said data set is randomly generated.

34. The method of claim 32, wherein said data set is generated by a user.

35. An apparatus for dynamic encryption of information including data, voice, and graphics, by automatic, periodic changes to a set of encryption programs and to the repetition count for each program, comprising:

a memory containing more than one distinct encryption/decryption program and the information to be encrypted and decrypted,
a first encryption processor serially executing certain of said encryption/decryption programs, each encryption/decryption program partially encrypting the information,
a code set specifying the identities of the encryption/decryption programs, and
a data set specifying which of said encryption/decryption programs identified by said code set are to be executed by said first encryption processor, the order of execution of said encryption/decryption programs, and the number of times each encryption/decryption program is executed, the contents of said data set changing automatically and periodically.

36. The apparatus of claim 35, wherein each of said encryption/decryption programs itself remains unmodified by the first encryption processor.

37. The apparatus of claim 35, wherein said data set is initially randomly generated.

38. The apparatus of claim 35, wherein said data set is initially created by the user.

39. The apparatus of claim 35, wherein two of said apparatus are connected in a network and cooperate to automatically and periodically change the contents of said data set.

40. The apparatus of claim 39, wherein the contents of said data set changes at least once per minute.

41. The apparatus of claim 6, wherein the contents of said data set changes with every transmission between the two apparatuses.

42. A method for performing dynamic encryption of information including data, voice, and graphics at a first location and dynamic decryption of the information at a second location, by automatic, periodic changes to a set of encryption programs and to the repetition count for each program, comprising the steps of:

at the first location:
generating, in a first memory, a data set whose contents specify the identity, order of execution, and repetition count of members of a group of more than one distinct encryption/decryption programs, each encryption/decryption program residing in a second memory,
transmitting said data set to the second location, parsing said data set,
executing each specified encryption/decryption program in the order of execution and number of repetitions indicated by said data set, each encryption/decryption program partially encrypting the information,
transmitting the encrypted information to the second location,
automatically and periodically changing the contents of said data set at the first location and transmitting the changed contents of said data set to the second location, at the second location:
receiving said data set from the first location,
parsing said data set, and
executing each specified encryption/decryption program in the order of execution and number of repetitions indicated by said data set to decrypt the information, and
automatically and periodically receiving a said data set whose contents have been changed at the first location.

43. The method of claim 30, wherein said data set is initially randomly generated.

44. The method of claim 30, wherein said data set is initially generated by the user.

* * * * *